(12) United States Patent
Kuroki

(10) Patent No.: US 10,109,299 B2
(45) Date of Patent: Oct. 23, 2018

(54) SOUND PROCESSING APPARATUS, SOUND PROCESSING METHOD, AND STORAGE MEDIUM

(71) Applicant: CANON KABUSHIKI KAISHA, Tokyo (JP)

(72) Inventor: Tomohiko Kuroki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/258,386

(22) Filed: Sep. 7, 2016

(65) Prior Publication Data

US 2017/0092296 A1 Mar. 30, 2017

(30) Foreign Application Priority Data

Sep. 24, 2015 (JP) ................................. 2015-187441

(51) Int. Cl.
*H04R 29/00* (2006.01)
*G10L 25/57* (2013.01)
(Continued)

(52) U.S. Cl.
CPC .......... *G10L 25/57* (2013.01); *G06K 9/00771* (2013.01); *G08B 13/1672* (2013.01);
(Continued)

(58) Field of Classification Search
CPC .... H04R 1/406; H04R 3/005; H04R 2499/11; H04R 1/028; H04R 2201/401;
(Continued)

(56) References Cited

U.S. PATENT DOCUMENTS

| 7,123,214 | B2 | 10/2006 | Kuroki et al. |
| 2005/0271251 | A1* | 12/2005 | Russell ............. G06K 9/00288 382/103 |

(Continued)

FOREIGN PATENT DOCUMENTS

| CN | 103196838 A | 7/2013 |
| CN | 103198838 A * | 7/2013 |

(Continued)

OTHER PUBLICATIONS

T. Heittola, et al.: "Context-dependent sound event detection", EURASIP Journal on Audio, Speech, and Music Processing, vol. 2013, No. 1, Jan. 1, 2013, p. 1, XP055262984, DE, ISSN: 1687-4722, DOI: 10.1109/89.365379.

(Continued)

*Primary Examiner* — Akelaw Teshale
(74) *Attorney, Agent, or Firm* — Fitzpatrick, Cella, Harper & Scinto

(57) ABSTRACT

A sound processing apparatus includes a detection unit adapted to detect a situation of a subject to be imaged from image data generated by imaging the subject to be imaged by an imaging unit; an extraction unit adapted to extract a feature amount of a sound from sound data generated by a sound acquisition unit corresponding to the imaging unit; and a determination unit adapted to execute a process of comparing the feature amount of the sound extracted by the extraction unit with a feature amount of a specific sound in accordance with the situation of the subject to be imaged detected by the detection unit, thereby determining whether the sound contains the specific sound.

10 Claims, 13 Drawing Sheets

(51) Int. Cl.
*G06K 9/00* (2006.01)
*G08B 13/16* (2006.01)
*G08B 13/196* (2006.01)
*H04N 7/18* (2006.01)
*G10L 25/51* (2013.01)
*G10L 25/78* (2013.01)
*G10L 25/03* (2013.01)

(52) U.S. Cl.
CPC ........ G08B 13/19695 (2013.01); G10L 25/51 (2013.01); H04N 7/18 (2013.01); G10L 25/03 (2013.01); G10L 25/78 (2013.01)

(58) Field of Classification Search
CPC ............ H04R 2430/20; H04R 2430/23; H04R 29/005; H04R 3/12; H04R 1/1083; H04R 2201/405; H04R 2430/01; H04R 2499/13; H04R 2499/15; H04R 25/407; H04R 29/004
USPC .................................. 381/92, 1, 17, 303, 56
See application file for complete search history.

(56) References Cited

U.S. PATENT DOCUMENTS

| | | | | |
|---|---|---|---|---|
| 2009/0141988 | A1* | 6/2009 | Kovtun | G06F 17/30793 382/225 |
| 2011/0082690 | A1* | 4/2011 | Togami | H04R 1/406 704/201 |
| 2012/0300022 | A1* | 11/2012 | Kaneko | G08B 29/188 348/36 |
| 2014/0046878 | A1* | 2/2014 | Lecomte | G10L 25/51 706/12 |
| 2014/0055610 | A1* | 2/2014 | Ko | G06K 9/00771 348/143 |
| 2015/0262017 | A1* | 9/2015 | Oguchi | G06K 9/00744 382/190 |
| 2015/0281833 | A1* | 10/2015 | Shigenaga | H04R 3/005 381/92 |
| 2016/0078286 | A1* | 3/2016 | Tani | G06K 9/00778 348/143 |
| 2016/0379456 | A1* | 12/2016 | Nongpiur | G08B 13/1672 340/541 |

FOREIGN PATENT DOCUMENTS

| | | |
|---|---|---|
| CN | 102737480 B | 3/2014 |
| CN | 104144328 A | 11/2014 |
| JP | 2004-357014 A | 12/2004 |
| WO | 2008/016360 A1 | 2/2008 |
| WO | 2014/174738 A1 | 10/2014 |

OTHER PUBLICATIONS

European Search Report dated Feb. 23, 2017 in European Application No. 16183924.6.

* cited by examiner

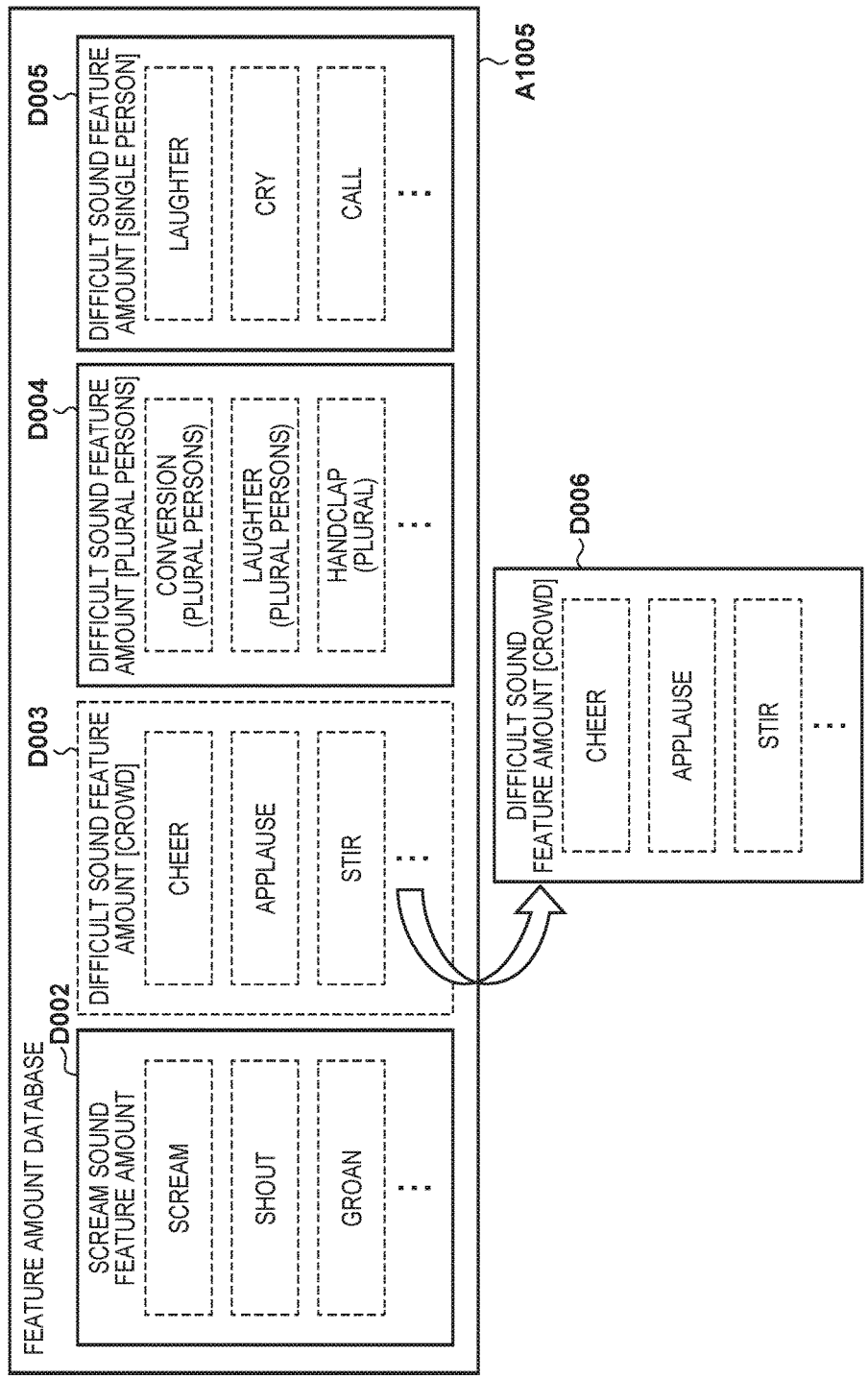

SOUND PROCESSING APPARATUS, SOUND PROCESSING METHOD, AND STORAGE MEDIUM

BACKGROUND OF THE INVENTION

Field of the Invention

The present invention relates to a sound processing apparatus, sound processing method, and storage medium and, more particularly, to a technique of detecting a sound.

Description of the Related Art

In a monitoring camera system, sound monitoring by which a user monitors the sound of an imaging site is known. Especially in a recent monitoring camera system, abnormal sound detection which automatically detects an abnormality from the sound of a site and performs notification without 24-hour monitoring by an observer is known. Japanese Patent Laid-Open No. 2004-357014 describes a method of detecting an abnormal sound and performing notification based on a feature amount such as the frequency or cepstrum of a sound, and a method of determining whether an environment sound is an abnormal sound by using a feature amount database storing the feature amounts of surrounding environment sounds in order to reduce false detection.

Unfortunately, the conventional arrangement performs determination by referring to the feature amount database in which the feature amounts of site environments are registered beforehand in a specific situation. Therefore, no sufficient detection accuracy can be obtained in a situation different from the environments in which the feature amounts of the database were obtained. Especially in a monitoring camera which performs 24-hour monitoring, a change in site environment significantly appears in accordance with time zones, and the detection accuracy largely decreases depending on a situation.

SUMMARY OF THE INVENTION

The present invention provides a technique capable of accurately detecting a specific sound, and has, for example, the following arrangement.

According to one aspect of the present invention, a sound processing apparatus includes: a detection unit adapted to detect a situation of a subject to be imaged from image data generated by imaging the subject to be imaged by an imaging unit; an extraction unit adapted to extract a feature amount of a sound from sound data generated by a sound acquisition unit corresponding to the imaging unit; and a determination unit adapted to execute a process of comparing the feature amount of the sound extracted by the extraction unit with a feature amount of a specific sound in accordance with the situation of the subject to be imaged detected by the detection unit, thereby determining whether the sound contains the specific sound.

According to another aspect of the present invention, a sound processing method includes: detecting a situation of a subject to be imaged from image data generated by imaging the subject to be imaged by an imaging unit; extracting a feature amount of a sound from sound data generated by a sound acquisition unit corresponding to the imaging unit; and executing a process of comparing the feature amount of the sound extracted in the extracting with a feature amount of a specific sound in accordance with the situation of the subject to be imaged detected in the detecting, thereby determining whether the sound contains the specific sound.

Further features of the present invention will become apparent from the following description of exemplary embodiments (with reference to the attached drawings).

BRIEF DESCRIPTION OF THE DRAWINGS

FIG. 3 is a view showing the arrangement of a feature amount database;

DESCRIPTION OF THE EMBODIMENTS

Figure 1:
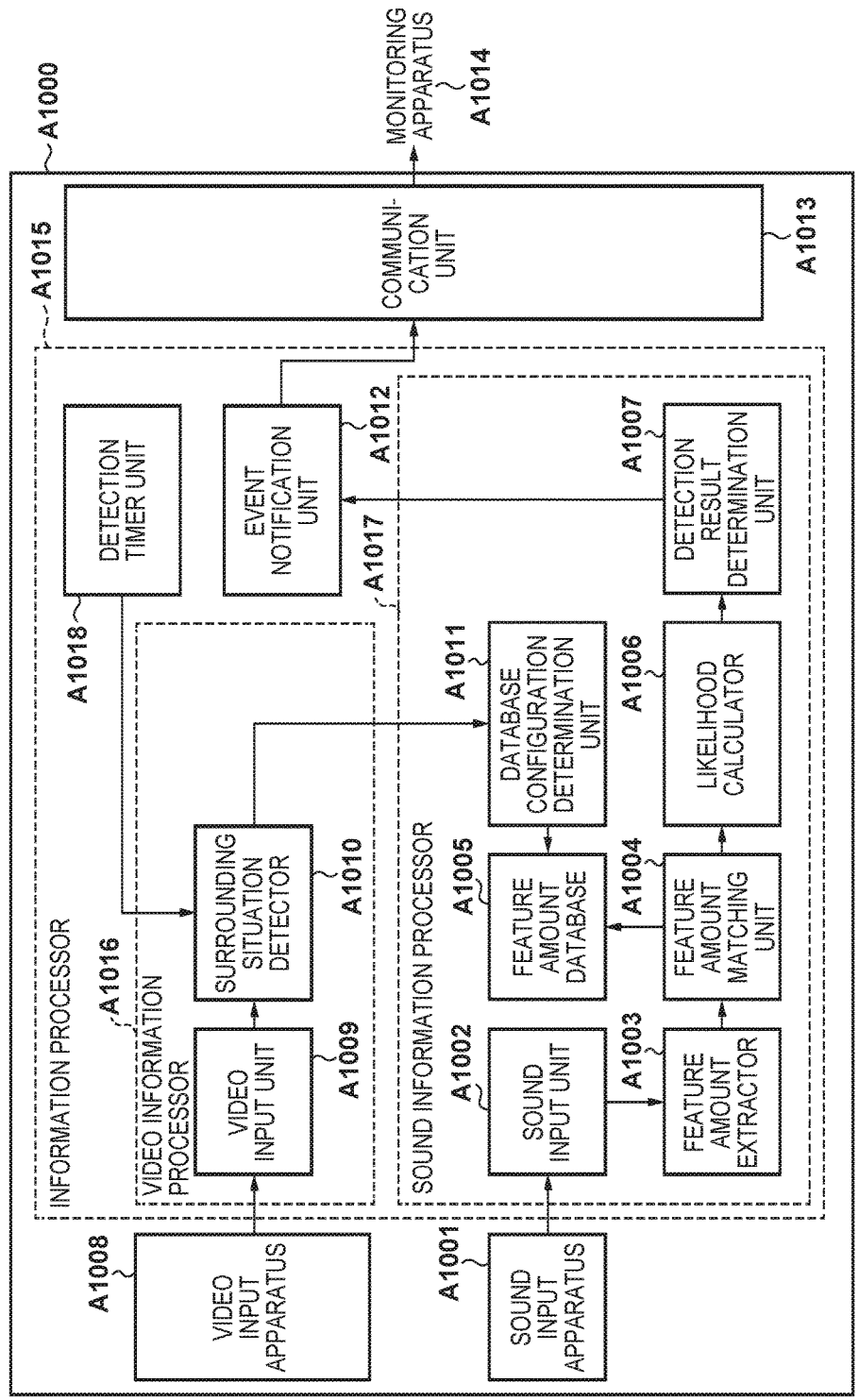
FIG. 1 is a block diagram showing the functional configuration of a monitoring camera system.

Embodiments of the present invention will be explained in detail below with reference to the accompanying drawings. Note that arrangements to be disclosed in the following embodiments are merely examples, and the present invention is not limited to those examples shown in the drawings.

(Monitoring System)

A configuration example of a monitoring system according to an embodiment of the present invention will be explained with reference to FIG. 1. FIG. 1 is a block diagram showing the functional configuration of the monitoring system according to this embodiment.

An abnormal sound monitoring system A1000 is a system for monitoring an abnormality of a person in an imaging site. If a person screams or shouts in an imaging site, the abnormal sound monitoring system A1000 detects it as an abnormal sound and notifies a monitoring apparatus A1014 of the event. The abnormal sound monitoring system A1000 includes a video input apparatus A1008, a sound input apparatus A1001, an information processor A1015, and a communication unit A1013, and the communication unit A1013 is connected to the external monitoring apparatus A1014. The sound input apparatus A1001 is an apparatus for inputting sound data generated by collecting sounds around a subject to be imaged, and includes a microphone and the like. The video input apparatus A1008 is an apparatus for generating and inputting an image (video) by imaging surroundings, and includes a camera and the like.

The relationship between the angle of view of an image obtained by the video input apparatus A1008 and a sound collected by the sound input apparatus A1001 will be explained below. When the angle of view of an image obtained by the video input apparatus A1008 matches a sound collection range within which the sound input apparatus A1001 can collect sounds, it is possible to more accurately detect a specific sound. However, one purpose of detecting a specific sound is to detect changes outside the angle of view of an image. For example, a specific sound is detected in an application in which the angle of view of the video input apparatus A1008 is so changed as to perform imaging in a direction in which the specific sound is detected. Accordingly, the sound collection range within which the sound input apparatus A1001 can collect sounds can be made wider than the angle of view of an image. The specific sound detection accuracy can be increased in this case as well.

The information processor A1015 includes a video information processor A1016, a sound information processor A1017, a detection timer unit A1018, and an event notification unit A1012. The video information processor A1016 processes input video information. The sound information processor A1017 processes input sound information. The detection timer unit A1018 determines the frequency of video detection by using a timer. The event notification unit A1012 outputs a notification event outside.

The video information processor A1016 includes a video input unit A1009 for holding an input image, and a surrounding situation detector A1010 for detecting present surrounding information from an input image. The surrounding situation detector A1010 detects the situation of a subject to be imaged from image data generated by imaging the subject. In this embodiment, the surrounding situation detector A1010 counts persons in an image frame based on video input from the video input unit A1009, and outputs the results in three stages of "single person", "plural persons", and "many persons (crowd)". As a method of counting persons, face detection, template matching, or the like is used. Any method can be used as this face detection or template matching. The determination criteria for the output results are "single person" when there is 0 or 1 person, "plural persons" when there are 2 to 20 persons, and "many persons" when there are more than 20 persons.

The sound information processor A1017 includes a sound input unit A1002, a feature amount extractor A1003, a feature amount matching unit A1004, a feature amount database A1005, a likelihood calculator A1006, a detection result determination unit A1007, and a database configuration determination unit A1011. The sound input unit A1002 receives an input sound from the sound input apparatus A1001. The feature amount extractor A1003 extracts the feature amount of a sound from the sound data (input sound) input from the sound input unit A1002. Examples of the feature amount used herein are the fundamental frequency, formant frequency, or spectrum of a sound, mel-frequency cepstrum coefficients (MFCC) obtained from the cepstrum of a sound, zero crossing, and subband energy. A detailed explanation of the MFCC, zero crossing, and subband energy will be omitted.

The feature amount database A1005 stores and holds the feature amounts of specific sounds including abnormal sounds. As will be described later, the feature amount database A1005 holds feature amounts representing the features of sounds for each of a plurality of surrounding situations (in this embodiment, the number of persons in an input image). The feature amount matching unit A1004 has a function of comparing a feature amount extracted by the feature amount extractor A1003 with each feature amount corresponding to a surrounding situation in the feature amount database A1005.

The likelihood calculator A1006 calculates the likelihood of the feature amount of the input sound with respect to the feature amount of each matching target in the feature amount database A1005 based on the results of the feature amount matching unit A1004. The likelihood calculator A1006 outputs candidates for detection results and their likelihood calculation scores by so-called N-Best. A detailed explanation of N-Best will be omitted.

The detection result determination unit A1007 uses the top of the candidates output from the likelihood calculator A1006 as a detection result. If this candidate is a sound registered as an abnormal sound and the score has exceeded a predetermined threshold, the detection result determination unit A1007 determines that an abnormality has occurred, and notifies the event notification unit A1012 of the abnormality.

The database configuration determination unit A1011 has a function of switching the configurations of the feature amounts registered in the feature amount database A1005, from information indicating the number of persons and congestion detected by the surrounding situation detector A1010.

Figure 2:
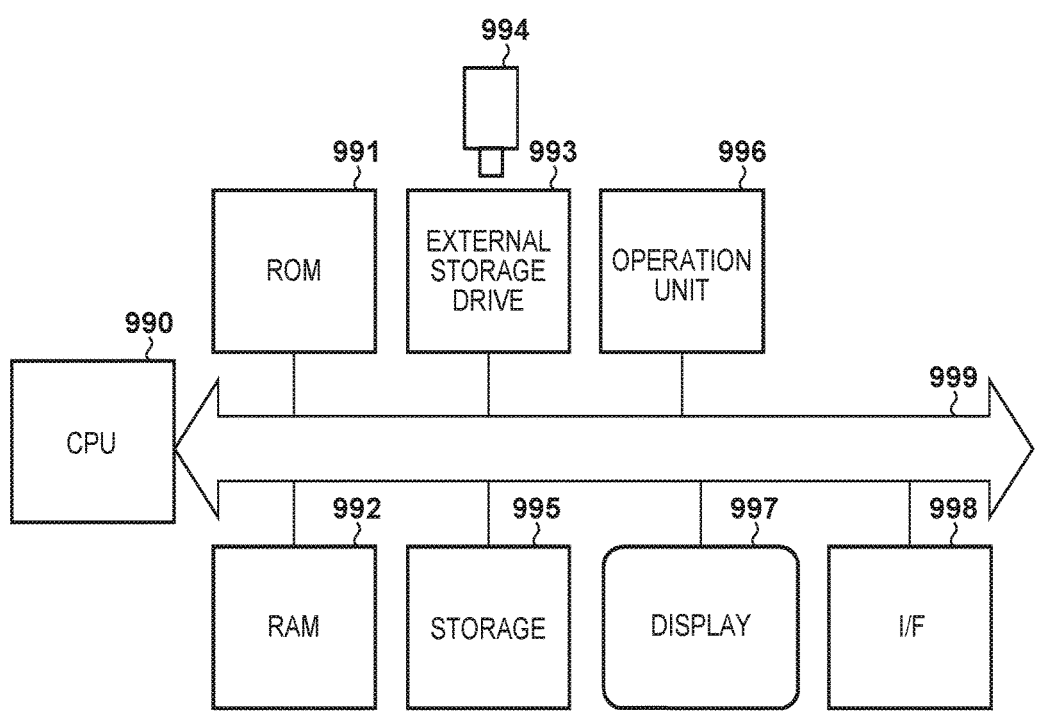
FIG. 2 is a block diagram showing the hardware configuration of the monitoring camera system.

FIG. 2 is a block diagram showing a hardware configuration example of the abnormal sound monitoring system A1000 according to this embodiment. The abnormal sound monitoring system A1000 is implemented by a personal computer (PC), tablet terminal, or the like.

In FIG. 2, a CPU 990 is a central processing unit, and controls the operation of the whole abnormal sound monitoring system A1000 in cooperation with other constituent elements based on computer programs. A ROM 991 is a read only memory, and stores a basic program and data to be used in basic processing. A RAM 992 is a writable memory, and functions as, for example, a work area of the CPU 990.

An external storage drive 993 implements access to a storage medium, and can load computer programs and data stored in a medium (storage medium) 994 such as a USB memory into this system. A storage 995 is a device which functions as a large-capacity memory such as an SSD (Solid State Drive). The storage 995 stores various computer programs and data.

An operation unit 996 is a device for accepting instructions and commands input by the user, and includes a keyboard, pointing device, touch panel, and the like. A display 997 is a display device for displaying, for example, a command input from the operation unit 996, and a response output from the abnormal sound monitoring system A1000 to the command. An interface (I/F) 998 is a device for intermediating data exchange between the system and an external apparatus. A system bus 999 is a data bus through which data flows in the abnormal sound monitoring system A1000.

The individual functional elements of the abnormal sound monitoring system A1000 shown in FIG. 1 are implemented by the CPU 990 by controlling the whole system based on computer programs. However, some or all of these functional elements may also be formed by dedicated hardware.

(Feature Amount Database)

FIG. 3 is a view showing a configuration example of the feature amount database A1005 according to this embodiment. The feature amount database A1005 contains a scream sound feature amount D002, a difficult sound (a specific sound for which the detection accuracy decreases) feature amount [crowd] D003, a difficult sound feature amount [plural persons] D004, and a difficult sound feature amount [single person] D005. The scream sound feature amount D002 is the feature amount of an abnormal sound of a person, such as a scream, shout, or groan.

The difficult sound feature amounts are the feature amounts of difficult sounds close to the scream sound. In this embodiment, the difficult sound feature amounts are held as they are classified into the difficult sound feature amount [crowd] D003, difficult sound feature amount [plural persons] D004, and difficult sound feature amount [single person] D005 in accordance with the number of persons. The difficult sound feature amount [crowd] D003 has feature amounts such as "cheer", "applause", and "stir" as sounds which are not generated without many persons. The difficult sound feature amount [plural persons] D004 has feature amounts such as "conversation (plural persons)", "laughter (plural persons)", and "handclap (plural)" as sounds which are not generated without plural persons. The difficult sound feature amount [single person] D005 has feature amounts such as "laughter", "cry", and "call" as sounds which can be generated even by a single person.

As described above, the feature amounts in the feature amount database A1005 are formed by a plurality of feature amount data grouped in accordance with the contents. These feature amounts can dynamically be canceled from or set in the database as needed, and hence can be excluded from or included in matching targets of the feature amount matching unit A1004 (D006).

(Operation Procedure)

The procedure of an operation of replacing the contents of the feature amount database in accordance with the present situation input from an image will be explained below with reference to flowcharts shown in FIG. 4A and FIG. 4B. Each of the following steps is executed under the control of the CPU 990.

In this embodiment, a specific sound is detected by comparing the feature amount of the specific sound corresponding to the situation of a subject to be imaged, which is detected by the surrounding situation detector A1010, with a feature amount extracted by the feature amount extractor A1003. More specifically, in steps S101 to S112 shown in FIG. 4A, a feature amount database configuration updating process which updates the configuration of the feature amount database A1005 in accordance with the situation of a subject to be imaged, which is detected based on input video information, is executed. Then, in steps S113 to S120 shown in FIG. 4B, an abnormal sound detecting process which detects an abnormal sound by using the updated feature amount database A1005 is executed. In this embodiment as described above, an abnormal sound is detected by using the feature amount database A1005 corresponding to the situation of a subject to be imaged, so the abnormal sound can accurately be detected regardless of the situation of the subject to be imaged.

When activated, the abnormal sound monitoring system A1000 receives video information from the video input apparatus A1008 and stores the information in the video input unit A1009 in step S101. Then, in step S102, the surrounding situation detector A1010 analyzes the input video information, and detects the number of persons and congestion (the degree of congestion) on the image.

Subsequently, in step S103, whether the congestion is on a many-person level (crowd) is determined based on the information detected by the surrounding situation detector A1010. The process advances to step S105 if the result is TRUE (YES in step S103), and advances to step S104 if the result is FALSE (NO in step S103).

In step S104, whether the difficult sound feature amount [crowd] D003 is set in the present feature amount database A1005 is determined. The process advances to step S106 if the result is TRUE (YES in step S104), and advances to step S108 if the result is FALSE (NO in step S104).

In step S105, whether the difficult sound feature amount [crowd] D003 is set in the present feature amount database A1005 is determined. The process advances to step S109 if the result is TRUE (YES in step S105), and advances to step S107 if the result is FALSE.

In step S106, the difficult sound feature amount [crowd] D003 storing the feature amounts of sounds of a crowd, which are not uttered in the present situation, is canceled from the feature amount database A1005. Then, the process advances to step S108.

In step S107, the difficult sound feature amount [crowd] D003 storing the feature amounts of sounds of a crowd, which can be uttered in the present situation, is set in the feature amount database A1005. Then, the process advances to step S109.

In step S108, whether the congestion is on a plural-person level is determined based on the information detected by the surrounding situation detector A1010. The process advances to step S109 if the result is TRUE (YES in step S108), and advances to step S110 if the result is FALSE (NO in step S108).

In step S109, whether the difficult sound feature amount [plural persons] D004 is set in the present feature amount database A1005 is determined. The process advances to step S113 if the result is TRUE (YES in step S109), and advances to step S111 if the result is FALSE (NO in step S109).

In step S110, whether the difficult sound feature amount [plural persons] D004 is set in the present feature amount database A1005 is determined. The process advances to step S112 if the result is TRUE (YES in step S110), and advances to step S113 if the result is FALSE (NO in step S110).

In step S111, the difficult sound feature amount [plural persons] D004 storing the feature amounts of sounds of plural persons, which can be uttered in the present situation, is set in the feature amount database A1005. Then, the process advances to step S113.

In step S112, the difficult sound feature amount [plural persons] D004 storing the feature amounts of sounds of plural persons, which are not uttered in the present situation, is canceled from the feature amount database A1005. Then, the process advances to step S113.

In step S113, a timeout time of 5 sec for performing next surrounding situation detection for updating the feature amount database A1005 is set in the detection timer unit A1018. In step S114, the feature amount extractor A1003 extracts the feature amount of the sound input to the sound input unit A1002. In step S115, the feature amount matching unit A1004 compares the feature amount extracted by the feature amount extractor A1003 with each feature amount in the feature amount database A1005.

Then, in step S116, the likelihood calculator A1006 calculates the likelihood between each feature amount in the database A1005 and the feature amount of the input sound.

In step S117, the detection result determination unit A1007 determines whether the closest sound of the likelihood calculation results is a scream sound and its likelihood has exceeded a predetermined threshold. If a scream sound having likelihood exceeding the threshold is detected as an abnormal sound, the event notification unit A1012 is notified of this information. The monitoring apparatus A1014 is notified of the event information via the communication unit A1013.

In step S118, whether a sound is input to the sound input unit A1002 is determined. The process advances to step S113 if the result is TRUE (YES in step S118), and advances to step S119 if the result is FALSE (NO in step S118).

In step S119, whether an abnormal sound detection system On/Off SW (switch) (not shown) is operated by the user is determined. The process according to the flowchart is terminated if the result is TRUE (YES in step S119), and advances to step S120 if the result is FALSE (NO in step S119).

In step S120, whether the detection timer unit A1018 has timed out is determined. The process advances to step S101 if the result is TRUE (YES in step S120), and advances to step S118 if the result is FALSE (NO in step S120).

As described above, a feature amount corresponding to the degree of congestion of people detected in step S102 is set in the feature amount database configuration updating process, and an abnormal sound is detected based on the feature amount in the abnormal sound detecting process. Thus, the detection accuracy can be improved by performing abnormal sound detection by using the feature amount database optimum for the present situation. Also, in this embodiment, the feature amounts in the feature amount database are updated based on the situation of a subject to be imaged, and a specific sound is detected by comparing the feature amounts in the updated feature amount database with the extracted feature amount. More specifically, feature amount data corresponding to the situation of a subject to be imaged is set in the feature amount database, or unnecessary feature amount data is canceled from the feature amount database. This makes it possible to reduce the costs of the feature amount comparison process and likelihood calculation process, thereby reducing the CPU load and increasing the processing speed.

Figure 4A:
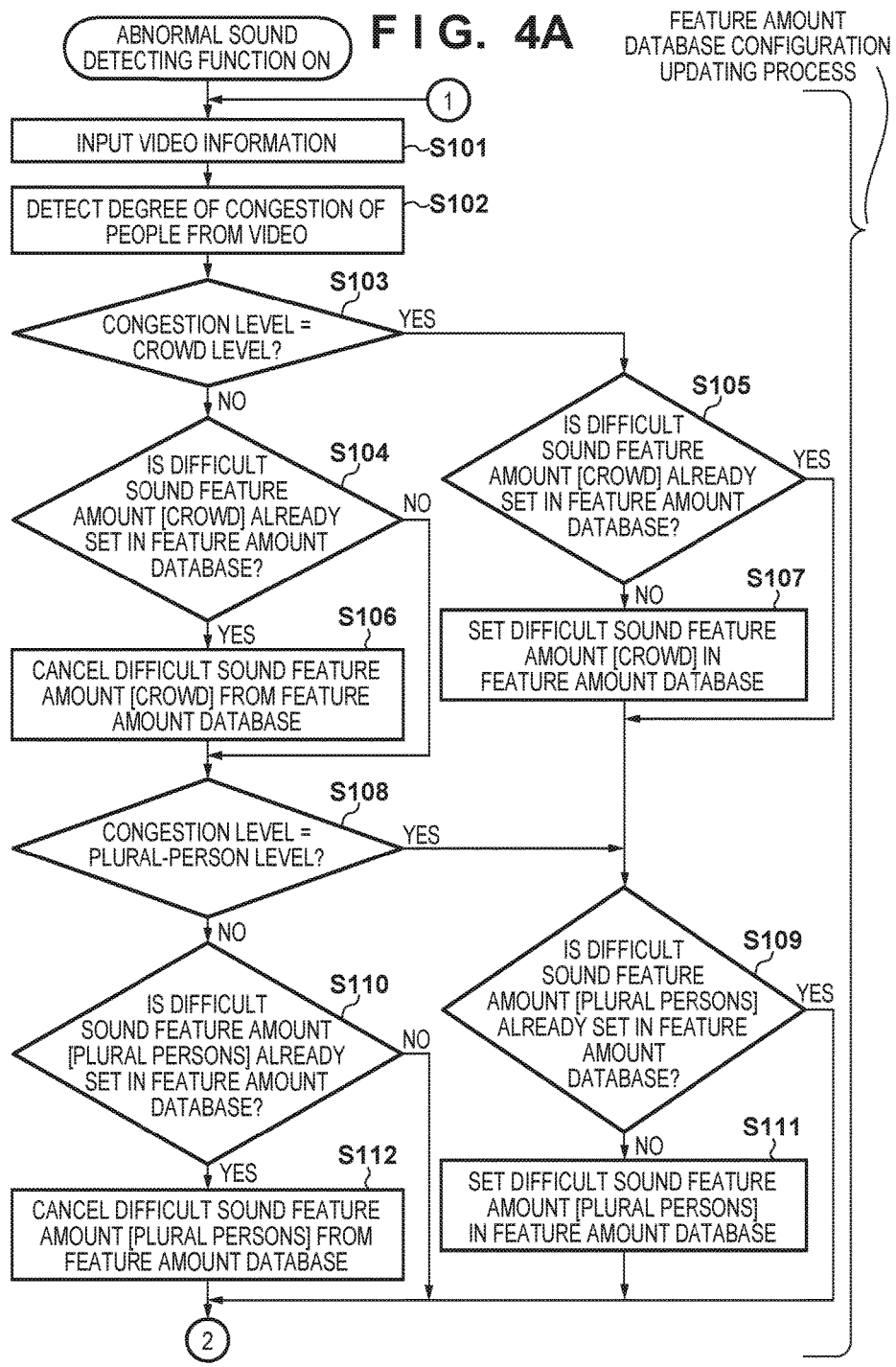
FIG. 4A and FIG. 4B are flowcharts showing the procedure of abnormal sound detection.
Figure 4B:
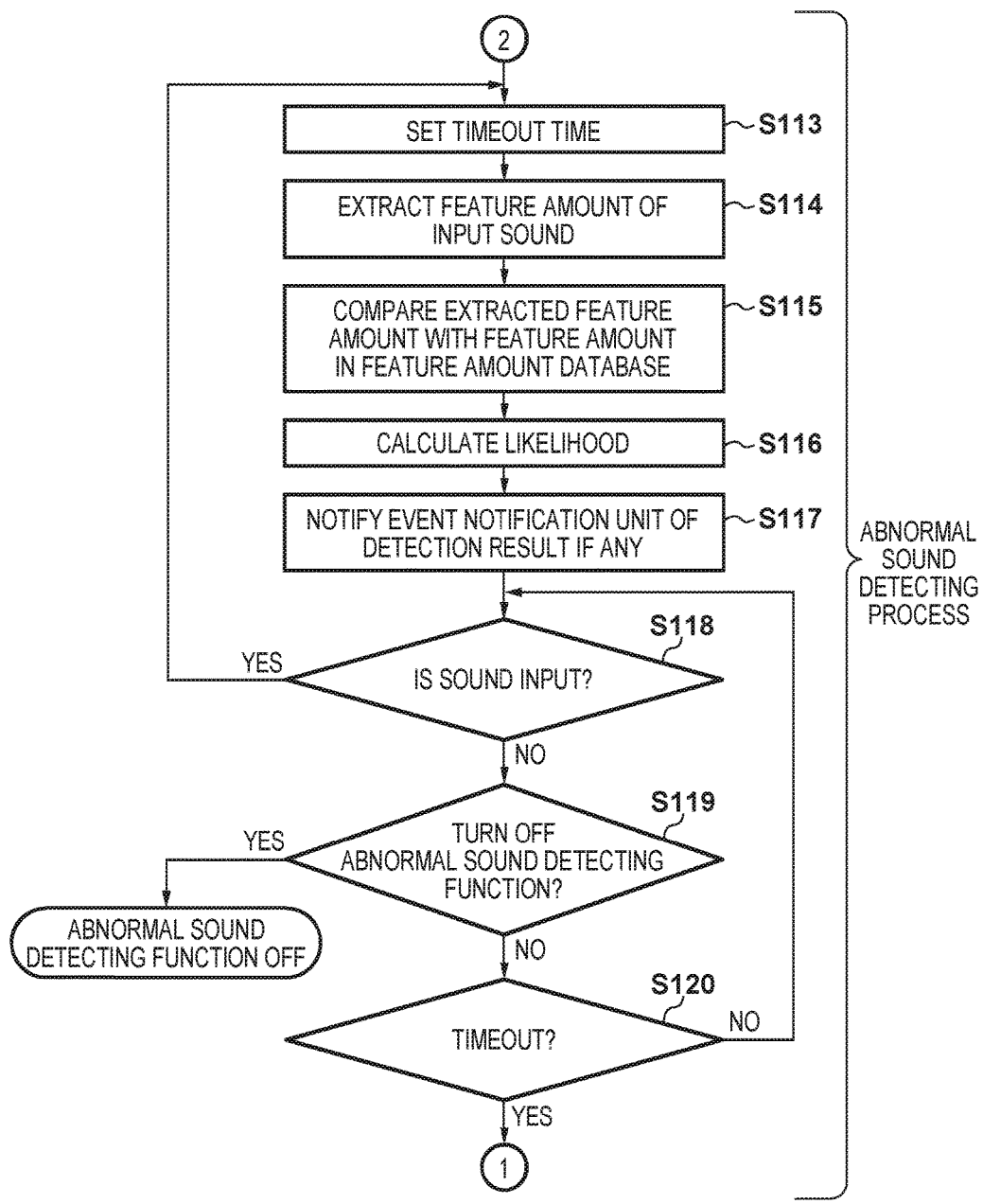

Note that the flowcharts of FIG. 4A and FIG. 4B shows the example in which if the congestion level is found to be a crowd level (YES in step S103), not only the difficult sound feature amount [crowd] D003 but also the difficult sound feature amount [plural persons] D004 is set (steps S107 and S111). To increase the efficiency of the process, however, it is also possible to set only the difficult sound feature amount [crowd] D003 if the congestion level is a crowd level.

Furthermore, this embodiment has explained the example in which the number of persons contained in an image based on image data is detected as the situation of a subject to be imaged. However, the present invention is not limited to this. For example, as the situation of a subject to be imaged, it is also possible to detect the number of specific objects such as cars, trains, ships, or manufacturing apparatuses, instead of persons. Alternatively, the brightness of an image based on image data may also be detected as the situation of a subject to be imaged.

The above-described embodiment has explained the example in which the contents of the feature amount database are updated in accordance with the detected situation of a subject to be imaged, thereby setting the feature amount of a specific sound corresponding to the situation of the subject to be imaged as a target to be compared with a feature amount extracted from sound data. Next, an example in which the feature amount of a specific sound corresponding to the detected situation of a subject to be imaged is set as a comparison target by weighting the likelihood of a feature amount held in the feature amount database in accordance with the situation of the subject to be imaged will be explained.

(Monitoring System)

Figure 5:
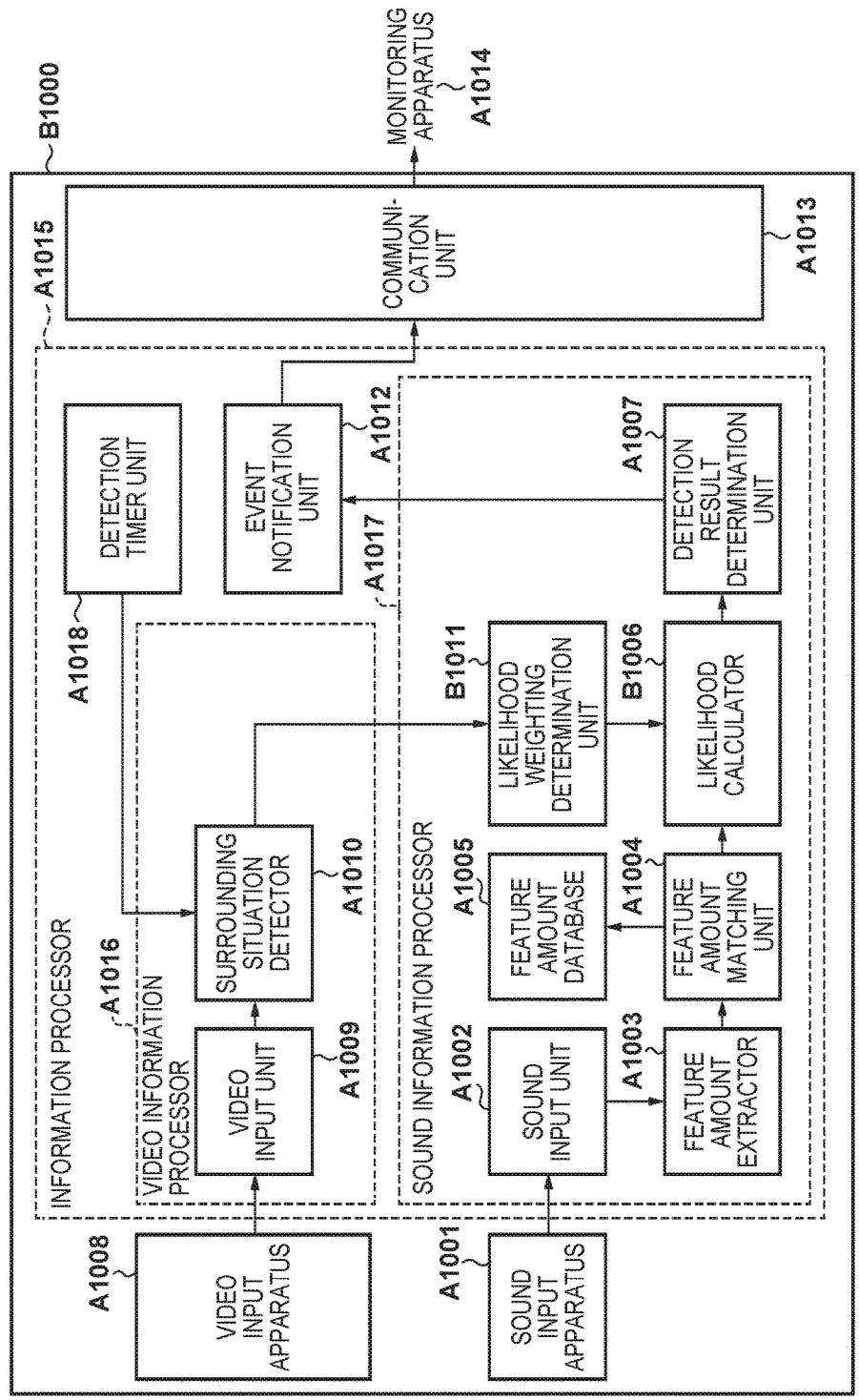
FIG. 5 is a block diagram of a monitoring camera system.

A configuration example of a monitoring system according to another embodiment of the present invention will be explained with reference to FIG. 5. FIG. 5 is a block diagram showing the functional configuration of the monitoring system according to this embodiment. Note that the hardware configuration of the monitoring system is the same as that of the above-described embodiment (FIG. 2).

An abnormal sound monitoring system B1000 is a system for monitoring an abnormality of a person in an imaging site. If a person screams or shouts in an imaging site, the abnormal sound monitoring system B1000 detects the scream or shout as an abnormal sound, and notifies a monitoring apparatus A1014 of the event.

Unlike the abnormal sound monitoring system A1000 shown in FIG. 1, the abnormal sound monitoring system B1000 of this embodiment includes a likelihood weighting determination unit B1011 for changing weighting of a likelihood calculation in accordance with the surrounding situation, instead of the database configuration determination unit A1011. Also, a likelihood calculator B1006 of this embodiment differs from the likelihood calculator A1006 shown in FIG. 1 in that the likelihood calculation is performed by taking account of the result of a likelihood calculation weighted in accordance with the surrounding situation. The rest of the arrangement is the same as that of the abnormal sound monitoring system A1000 shown in FIG. 1 explained in the above-described first embodiment, so a detailed explanation thereof will be omitted. As in the above-described embodiment, FIG. 3 shows a configuration example of a feature amount database A1005.

The weighting determination unit B1011 determines, from the result of a surrounding situation detector A1010, the possibility that the sound of each feature amount in the feature amount database A1005 is presently uttered, and calculates a weighting coefficient for the likelihood calculation score of each feature amount. More specifically, for the likelihood of a feature amount corresponding to the detected situation of a subject to be imaged, the weighting determination unit B1011 performs weighting by a value larger than the likelihood of a feature amount not corresponding to the detected situation of the subject to be imaged. For example, if the result of the surrounding situation detector A1010 is "many persons (crowd)", the weighting determination unit B1011 determines that the probability of utterance is sufficiently high for all sounds in the feature amount database A1005, and sets 1 as the weighting coefficients of all difficult sound feature amounts D003 to D005 in FIG. 5.

If the result of the surrounding situation detector A1010 is not "many persons" but "plural persons", the weighting determination unit B1011 determines that the probability at which the sounds of feature amounts of the difficult sound feature amount [crowd] D003 are uttered is low, and sets 0.9 as the weighting coefficient of the difficult sound feature amount [crowd] D003. The weighting determination unit B1011 sets 1 as the weighting coefficients of the difficult sound feature amounts D004 and D005 by determining that the utterance probability is sufficiently high.

If the result of the surrounding situation detector A1010 is "single person", the weighting determination unit B1011 determines that the probability at which the difficult sound feature amount [crowd] D003 is uttered is lowest, and sets 0.8 as the weighting coefficient. The weighting determination unit B1011 determines that the probability at which the sounds of feature amounts of the difficult sound feature amount [plural persons] D004 are uttered is low, and sets 0.9 as the weighting coefficient. The weighting determination unit B1011 determines that the utterance probability of the difficult sound feature amount [single person] D005 is sufficiently high, and sets 1 as the weighting coefficient. Also, the weighting determination unit B1011 sets 1 as the weighting coefficient of the scream sound feature amount D002 as an abnormal sound regardless of the surrounding situation detection result.

In addition to the function of A1006, the likelihood calculator B1006 multiplies the likelihood score by the weighting coefficient based on the results of the weighting determination unit B1011, thereby calculating the final likelihood calculation result. Assume that the result of the surrounding situation detector A1010 is "single person", and the detection result candidates are calculated in the order of cheer: 70, scream: 69, and handclap: 66. In this case, these candidates are respectively multiplied by weighting coefficients of 0.8, 1.0, and 0.9, so the final candidates and scores are scream: 69, handclap: 59, and cheer: 56.

(Operation Procedure)

The procedure of an operation of weighting the likelihood calculation in accordance with the present situation input from an image will be explained below with reference to a flowchart shown in FIG. 6. Each of the following steps is executed under the control of the CPU 990. Note that the same reference numerals as in FIG. 4A and FIG. 4B denote the same processes in FIG. 6.

Figure 6:
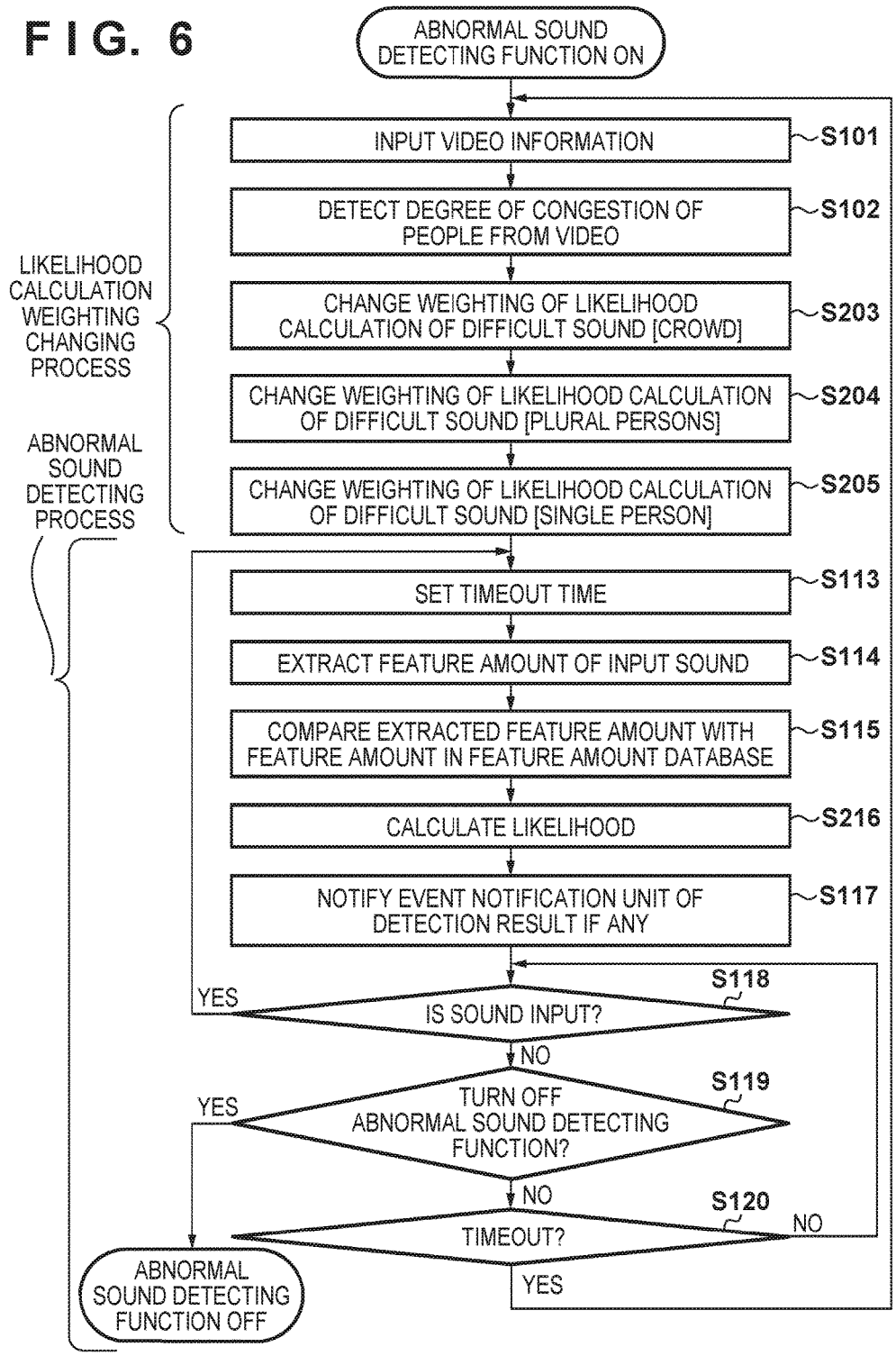
FIG. 6 is a flowchart showing the procedure of abnormal sound detection.

In steps S101 to S204 in FIG. 6, a likelihood calculation weighting changing process of changing likelihood weighting to be applied to each feature amount in accordance with the situation of a subject to be imaged, which is detected based on input video information, is executed. Then, in steps S113 to S120, an abnormal sound detecting process of detecting an abnormal sound by using the changed likelihood weighting is executed. In this embodiment as described above, an abnormal sound is detected by weighting the likelihood in accordance with the situation of a subject to be imaged. Accordingly, it is possible to accurately detect an abnormal sound regardless of the situation of a subject to be imaged.

When activated, the abnormal sound monitoring system B1000 stores video information from a video input apparatus A1008 in a video input unit A1009 in step S101. Then, in step S102, the surrounding situation detector A1010 analyzes the input video information, and detects the number of persons and congestion (the degree of congestion) on the image.

Subsequently, in step S203, the likelihood weighting determination unit B1011 calculates the likelihood weighting coefficient of the difficult sound feature amount [crowd] D003 from the results in step S102. In this step, 0.8, 0.9, and 1.0 are respectively set as the weighting coefficients when the number of persons is "single person", "plural persons", and "many persons (crowd)".

In step S204, the likelihood weighting determination unit B1011 calculates likelihood weighting coefficients of the difficult sound feature amount [plural persons] D004 from the results in step S102. In this step, 0.9 is set as the weighting coefficient when the number of persons is "single person", and 1.0 is set as the weighting coefficient when the number of persons is "plural persons" and "many persons".

In step S205, the likelihood weighting determination unit B1011 calculates likelihood weighting coefficients of the difficult sound feature amount [single person] D005 from the results in step S102. In the case of the difficult sound feature amount [single person] D005, 1.0 is set as the weighting coefficient regardless of the number of detected persons.

In step S113, a timeout time of 5 sec for performing next surrounding situation detection for updating the feature amount database A1005 is set in a detection timer unit A1018. In step S114, a feature amount extractor A1003 extracts the feature amount of a sound input to a sound input unit A1002. In step S115, a feature amount matching unit A1004 compares the feature amount extracted by the feature amount extractor A1003 with the feature amount in the feature amount database A1005.

In step S216, the likelihood calculator B1006 calculates the likelihood between each feature amount in the feature amount database A1005, which is multiplied by the coefficient calculated by the likelihood weighting determination unit B1011, and the feature amount of the input sound.

In step S117, a detection result determination unit A1007 determines whether the closest sound of the likelihood calculation results is a scream sound, and its likelihood has exceeded a predetermined threshold. If a scream sound having likelihood exceeding the threshold is detected as an abnormal sound, an event notification unit A1012 is notified of this information. The monitoring apparatus A1014 is notified of the event information via a communication unit A1013.

In step S118, whether a sound is input to the sound input unit A1002 is determined. The process advances to step S113 if the result is TRUE (YES in step S118), and advances to step S119 if the result is FALSE (NO in step S118).

In step S119, whether an abnormal sound detection system On/Off SW (switch) (not shown) is operated by the user is determined. The process according to the flowchart is terminated if the result is TRUE (YES in step S119), and advances to step S120 if the result is FALSE (NO in step S119).

In step S120, whether the detection timer unit A1018 has timed out is determined. The process advances to step S101 if the result is TRUE (YES in step S120), and advances to step S118 if the result is FALSE (NO in step S120).

In this embodiment as described above, the possibility of utterance is taken into account from the present situation, and the detection result is derived by weighting the likelihood calculation. This makes it possible to detect a specific sound such as an abnormal sound by a feature amount more suitable for the situation of a subject to be imaged, and improve the detection accuracy of abnormal sound detection.

The above-described embodiment has explained the example in which the number of specific objects (persons) contained in an image based on image data is detected as the situation of a subject to be imaged. Next, an example in which an exceptional sound (specific sound) of the traffic environment is detected by detecting the passing frequency of cars or the degree of traffic jam as the situation of a subject to be imaged will be explained.

(Monitoring System)

Figure 7:
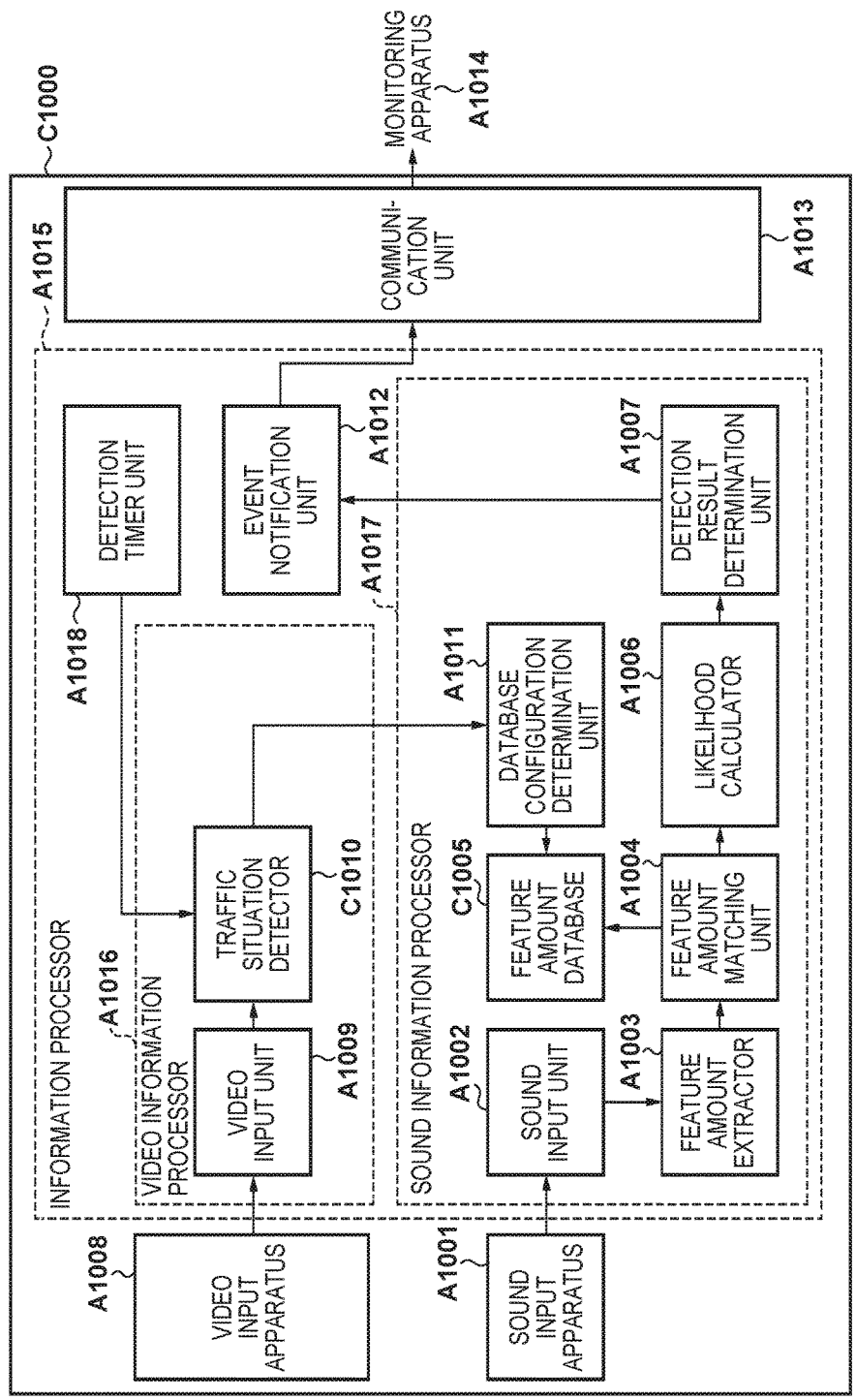
FIG. 7 is a block diagram of a monitoring camera system.

A configuration example of a monitoring system according to still another embodiment of the present invention will be explained with reference to FIG. 7. FIG. 7 is a block diagram showing the functional configuration of the monitoring system according to this embodiment. Note that the hardware configuration of the monitoring system is the same as that of the above-described embodiment (FIG. 2).

An abnormal sound monitoring system C1000 of this embodiment is a system for monitoring an abnormality of the traffic situation of a road. If a collision sound, glass breaking sound, explosive sound, or the like is generated in an imaging site, the abnormal sound monitoring system C1000 detects the sound as an abnormal sound, and notifies a monitoring apparatus A1014 of the event.

Unlike the abnormal sound monitoring system A1000 shown in FIG. 1, the abnormal sound monitoring system C1000 of this embodiment includes a traffic situation detector C1010, instead of the surrounding situation detector A1010. Also, the abnormal sound monitoring system C1000 includes a feature amount database (traffic sound feature amount database) C1005 storing the feature amounts of traffic sounds, instead of the feature amount database A1005 storing the feature amounts pertaining to a scream sound.

The traffic situation detector C1010 detects the number, passing speed, and passing frequency of automobiles in a frame based on an image input from a video input unit A1009, and determines the traffic situation from these pieces of information. As an example of this embodiment, if a state in which five or more cars among cars in a frame run at a passing speed of 20 km/h or less continues for 15 min or more, "congested" is output as the traffic situation. Therefore, "congested" is output even when only a traffic lane in one way is congested. Also, in a state which is not above-mentioned "congested" and in which the number of automobiles passing every 15 min is 125 or more, "heavy traffic" is output as the traffic situation. In other cases, "normal" is output as the traffic situation.

As a method of counting cars, template matching or the like can be used. In addition, as a method of obtaining the passing speed and passing frequency of cars, it is possible to use motion detection and passing detection. Well-known methods can be used as template matching, motion detection, and passing detection. The rest of the arrangement is the same as that of the abnormal sound monitoring system A1000 shown in FIG. 1 described in the above-described embodiment.

(Feature Amount Database)

Figure 8:
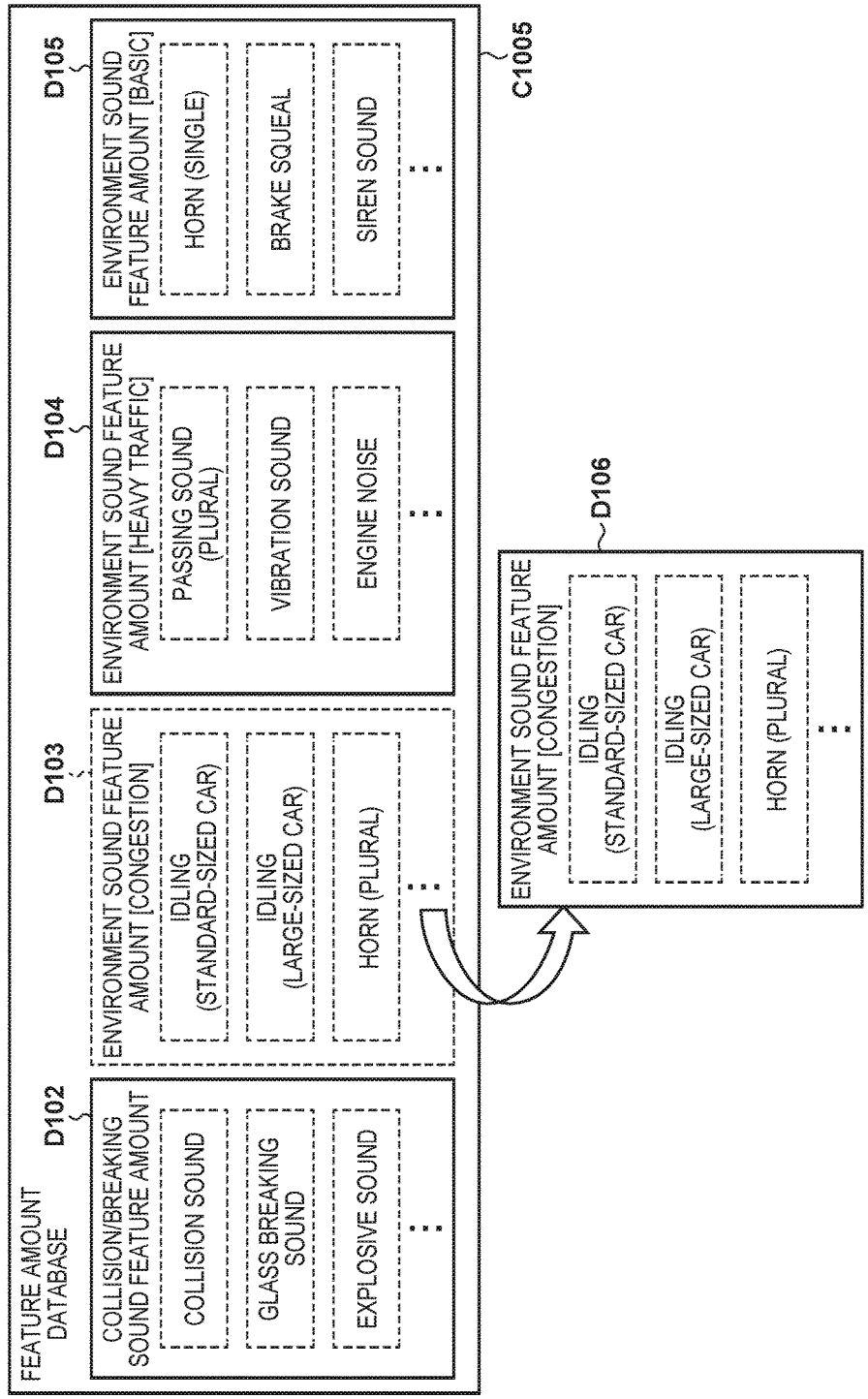
FIG. 8 is a view showing the arrangement of a feature amount database.

FIG. 8 is a view showing a configuration example of the feature amount database C1005 according to this embodiment. The feature amount database C1005 includes a collision/breaking sound feature amount D102, an environment sound feature amount [congestion] D103, an environment sound feature amount [heavy traffic] D104, and an environment sound feature amount [basic] D105. The collision/breaking sound feature amount D102 is an abnormal sound feature amount of traffic.

The environment sound feature amount is the feature amount of an environment sound around a subject to be imaged. In this embodiment, in order to reduce false detection, environment sound feature amounts are held as they are classified into the environment sound feature amount [congestion] D103, environment sound feature amount [heavy traffic] D104, and environment sound feature amount [basic] D105. The environment sound feature amount [congestion] 103 has feature amounts such as "idling (standard-sized car)", "idling (large-sized car)", and "horn (plural)" as sounds which are not generated unless cars are jammed as a traffic situation. The environment sound feature amount [heavy traffic] D104 has feature amounts such as "passing sound (plural)", "vibration sound", and "engine noise" as sounds which are not generated unless the traffic is very heavy although not congested. The environment sound feature amount [basic] D105 has feature amounts such as "horn (single)", "brake squeal", and "siren sound" as sounds which can be generated in a basic traffic situation.

The feature amounts in the feature amount database C1005 are formed by a plurality of feature amount data grouped in accordance with the contents. These feature amounts can dynamically be canceled from or set in the database as needed, and hence can be excluded from or included in matching targets of a feature amount matching unit A1004 (D106).

(Operation Procedure)

The procedure of an operation of replacing the contents of the feature amount database in accordance with the present situation input from an image will be explained below with reference to flowcharts shown in FIG. 9A and FIG. 9B. Each of the following steps is executed under the control of a CPU 990. Note that the same reference numerals as in FIG. 4A and FIG. 4B denote the same processes in FIG. 9A and FIG. 9B.

Figure 9A:
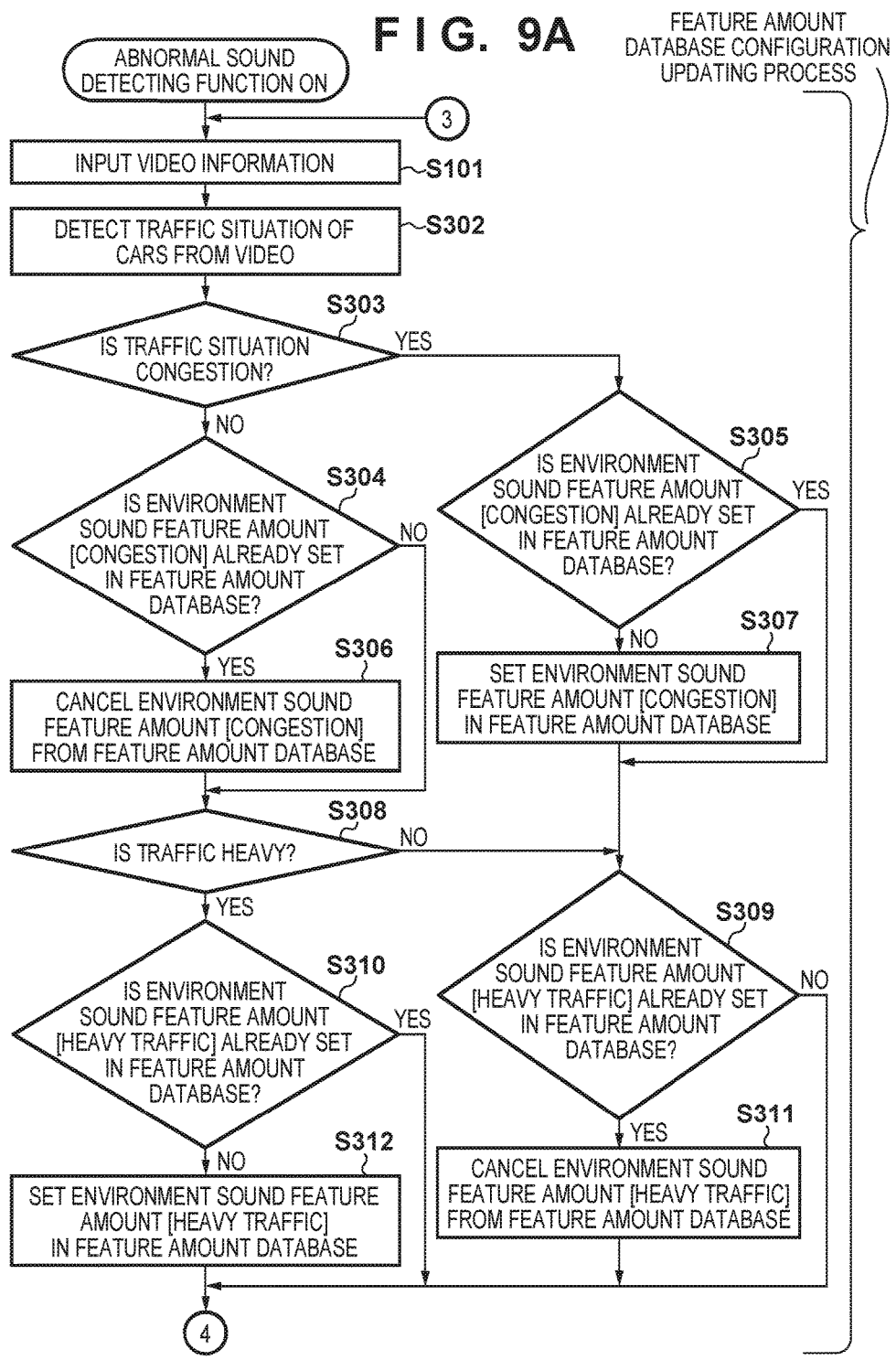
FIG. 9A and FIG. 9B are flowcharts showing the procedure of abnormal sound detection.
Figure 9B:
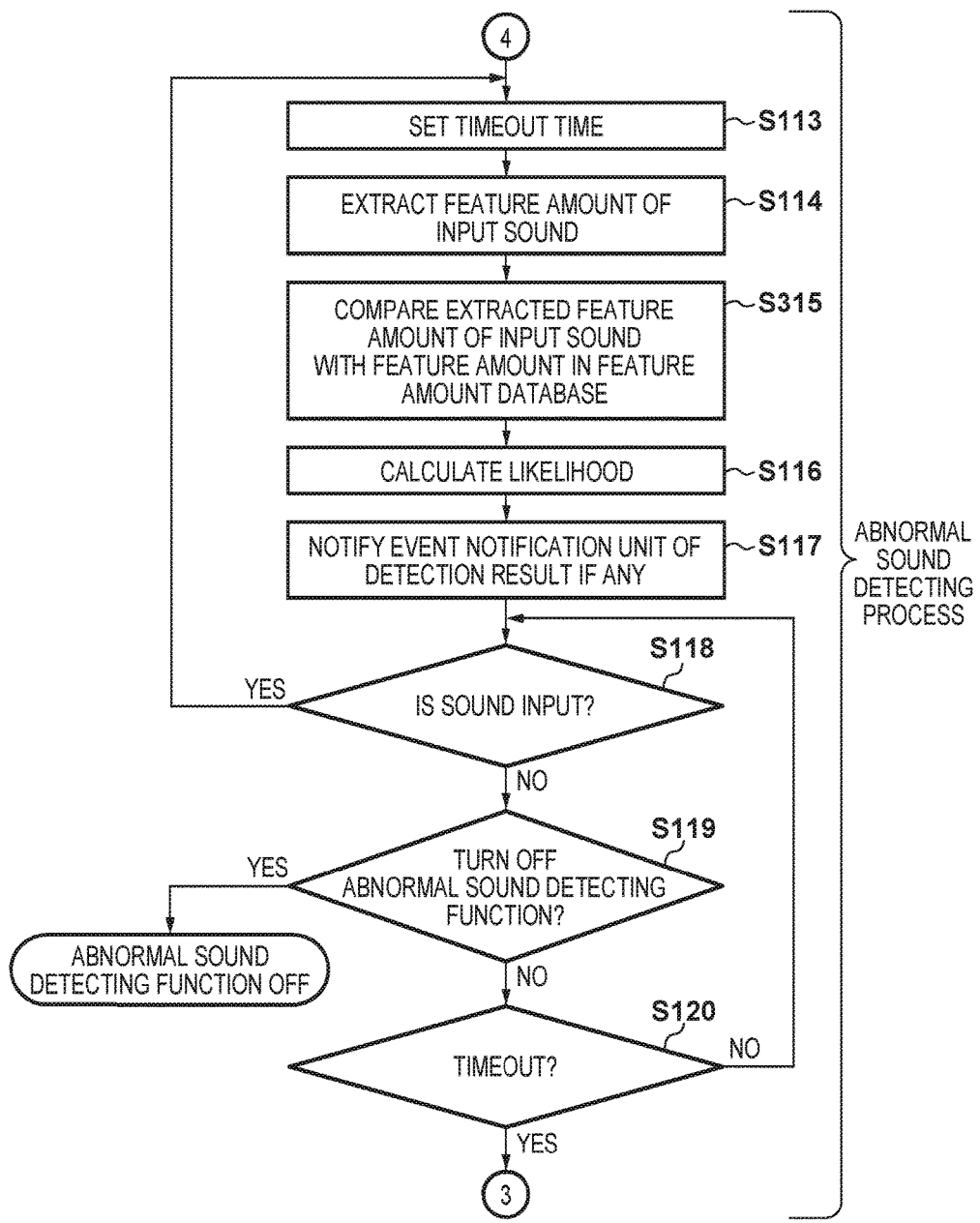

In steps S101 to S312 of FIG. 9A, a feature amount database configuration updating process which updates the configuration of the feature amount database C1005 in accordance with the situation of a subject to be imaged, which is detected based on input video information, is executed. Then, in steps S113 to S120 in FIG. 9B, an abnormal sound detecting process which detects an abnormal sound by using the updated feature amount database C1005 is executed. In this embodiment as described above, an abnormal sound is detected by using the feature amount database C1005 corresponding to the situation of a subject to be imaged, so the abnormal sound can accurately be detected regardless of the situation of the subject to be imaged.

When activated, the abnormal sound monitoring system C1000 receives video information from a video input apparatus A1008 and stores the information in the video input unit A1009 in step S101. Then, in step S302, the traffic situation detector C1010 analyzes the input video information, and detects the degree of congestion and the traffic from the number, passing speed, and passing frequency of cars on the image. In step S303, whether the traffic situation is congestion is determined based on the information detected by the traffic situation detector C1010. The process advances to step S305 if the result is TRUE (YES in step S303), and advances to step S304 if the result is FALSE (NO in step S303).

In step S304, whether the environment sound feature amount [congestion] D103 is set in the present feature amount database C1005 is determined. The process advances to step S306 if the result is TRUE (YES in step S304), and advances to step S308 if the result is FALSE (NO in step S304).

In step S305, whether the environment sound feature amount [congestion] D103 is set in the present feature amount database C1005 is determined. The process advances to step S309 if the result is TRUE (YES in step S305), and advances to step S307 if the result is FALSE.

In step S306, the environment sound feature amount [congestion] D103 storing the feature amounts of sounds of congestion, which are not generated in the present traffic situation, is canceled from the feature amount database C1005. Then, the process advances to step S308.

In step S307, the environment sound feature amount [congestion] D103 storing the feature amounts of sounds of congestion, which can be generated in the present traffic situation, is set in the feature amount database C1005.

In step S308, whether the traffic is heavy is determined based on the information detected by the traffic situation detector C1010. The process advances to step S310 if the result is TRUE (YES in step S308), and advances to step S309 if the result is FALSE (NO in step S308).

In step S309, whether the environment sound feature amount [heavy traffic] D104 is set in the present feature amount database C1005 is determined. The process advances to step S311 if the result is TRUE (YES in step S309), and advances to step S113 if the result is FALSE (NO in step S309).

In step S310, whether the environment sound feature amount [heavy traffic] D104 is set in the present feature amount database C1005 is determined. The process advances to step S113 if the result is TRUE (YES in step S310), and advances to step S312 if the result is FALSE (NO in step S310).

In step S311, the environment sound feature amount [heavy traffic] D104 storing the feature amounts of sounds when the traffic is heavy, which are not generated in the present traffic situation, is canceled from the feature amount database C1005. Then, the process advances to step S113.

In step S312, the environment sound feature amount [heavy traffic] D104 storing the feature amounts of sounds when the traffic is heavy, which can be generated in the present traffic situation, is set in the feature amount database C1005. Then, the process advances to step S113.

In step S113, a timeout time of 5 sec for performing next traffic situation detection for updating the feature amount database C1005 is set in a detection timer unit A1018. In step S114, a feature amount extractor A1003 extracts the feature amount of the sound input to a sound input unit A1002. In step S315, the feature amount matching unit A1004 compares the feature amount extracted by the feature amount extractor A1003 with each feature amount in the feature amount database C1005.

Then, in step S116, a likelihood calculator A1006 calculates the likelihood between each feature amount in the database C1005 and the feature amount of the input sound.

In step S117, a detection result determination unit A1007 determines whether the closest sound of the likelihood calculation results is a collision/breaking sound and its likelihood has exceeded a predetermined threshold. If a collision/breaking sound having likelihood exceeding the threshold is detected as an abnormal sound, the event notification unit A1012 is notified of this information. The monitoring apparatus A1014 is notified of the event information via a communication unit A1013.

In step S118, whether a sound is input to the sound input unit A1002 is determined. The process advances to step S113 if the result is TRUE (YES in step S118), and advances to step S119 if the result is FALSE (NO in step S118).

In step S119, whether an abnormal sound detection system On/Off SW (switch) (not shown) is operated by the user is determined. The process according to the flowchart is terminated if the result is TRUE (YES in step S119), and advances to step S120 if the result is FALSE (NO in step S119).

In step S120, whether the detection timer unit A1018 has timed out is determined. The process advances to step S101 if the result is TRUE (YES in step S120), and advances to step S118 if the result is FALSE (NO in step S120).

In this embodiment as described above, the feature amount database is updated in accordance with the present situation, and abnormal sound detection is performed by using an optimum feature amount database. Therefore, a high detection accuracy can be maintained regardless of the traffic situation. Also, this embodiment reduces the comparison process and likelihood calculation process of feature amounts by canceling unnecessary feature amount data from the feature amount database. This makes it possible to reduce the CPU load and improve the processing speed.

The above-described embodiment has explained the example in which when imaging a traffic environment, the contents of the feature amount database are updated in accordance with the detected situation of the subject to be imaged, thereby setting the feature amount of a specific sound corresponding to the situation of the subject to be imaged as a target to be compared with the feature amount extracted from sound data. Next, an example in which the feature amount of a specific sound corresponding to the detected situation of a subject to be imaged is set as a comparison target by weighting the likelihood of a feature amount held in the feature amount database in accordance with the situation of the subject to be imaged will be explained.

(Monitoring System)

Figure 10:
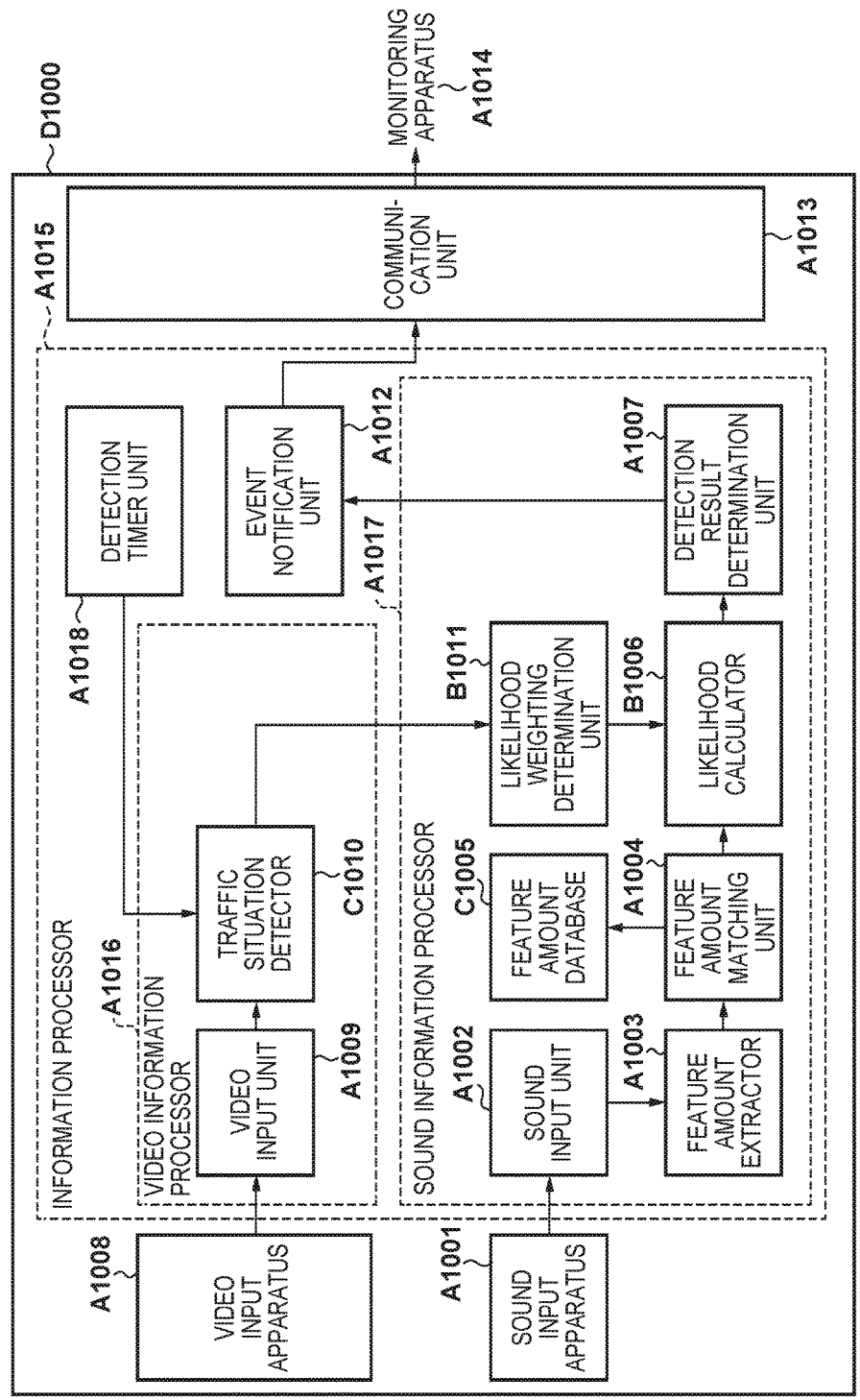
FIG. 10 is a block diagram of a monitoring camera system.

A configuration example of a monitoring system according to yet another embodiment of the present invention will be explained with reference to FIG. 10. FIG. 10 is a block diagram showing the functional configuration of the monitoring system according to this embodiment. Note that the hardware configuration of the monitoring system is the same as that of the above-described embodiment (FIG. 2).

An abnormal sound monitoring system D1000 is a system for monitoring an abnormality of the traffic situation of a road. If a collision sound, glass breaking sound, explosive sound, or the like is generated in an imaging site, the abnormal sound monitoring system D1000 detects the sound as an abnormal sound, and notifies a monitoring apparatus A1014 of the event.

Unlike the abnormal sound monitoring system C1000 shown in FIG. 7, the abnormal sound monitoring system D1000 of this embodiment includes a likelihood weighting determination unit B1011 for changing weighting of a likelihood calculation in accordance with the surrounding situation, instead of the database configuration determination unit A1011. Also, a likelihood calculator B1006 of this embodiment differs from the likelihood calculator A1006 shown in FIG. 7 in that the likelihood calculation is performed by taking account of the result of a likelihood calculation weighted in accordance with the surrounding situation. The rest of the arrangement is the same as that of the abnormal sound monitoring system C1000 shown in FIG. 7 explained in the above-described first embodiment, so a detailed explanation thereof will be omitted.

The weighting determination unit B1011 determines, from the result of a traffic situation detector C1010, the possibility that the sound of each feature amount in a feature amount database C1005 is presently generated, and calculates a weighting coefficient for the likelihood calculation score of each feature amount. If the result of the traffic situation detector C1010 is "congestion", the weighting determination unit B1011 determines that the generation probability of the sounds of feature amounts of an environment sound feature amount [congestion] D103 in the feature amount database C1005 is sufficiently high, and sets 1 as the weighting coefficient. On the other hand, the weighting determination unit B1011 determines that the generation probability of the sounds of feature amounts of an environment sound feature amount [heavy traffic] D104 is lowest when the traffic is congested, and sets 0.8 as the weighting coefficient.

If the result of the traffic situation detector C1010 is "heavy traffic", the weighting determination unit B1011 determines that the generation probability of the sounds of feature amounts of the environment sound feature amount [heavy traffic] D104 in the feature amount database C1005 is sufficiently high, and sets 1 as the weighting coefficient. On the other hand, if the traffic is heavy but is not congested, the weighting determination unit B1011 sets 0.8 as the weighting coefficient by determining that the generation probability of the sounds of feature amounts of the environment sound feature amount [congestion] D103 is lowest.

If the result of the traffic situation detector C1010 is "normal", the weighting determination unit B1011 determines that the generation probability of the sounds of feature amounts of the environment sound feature amount [congestion] D103 and environment sound feature amount [heavy traffic] D104 in the feature amount database C1005 is low, and sets 0.9 as the weighting coefficient. Since the generation probability of an environment sound feature amount [basic] D105 is sufficiently high in any state, 1 is set as the weighting coefficient for all the environment sound feature amounts D0103 to D0105 in FIG. 8. Also, 1 is set as the weighting coefficient of a collision/breaking sound feature amount D102 as an abnormal sound regardless of the traffic.

In addition to the function of A1006, the likelihood calculator B1006 multiplies the likelihood score by the weighting coefficient based on the results of the weighting determination unit B1011, thereby calculating the final likelihood calculation result. Assume that the result of the traffic situation detector C1010 is "heavy traffic", and the detection result candidates are calculated in the order of idling (large-sized car): 70, explosive sound: 69, and vibration sound: 59. In this case, these candidates are respectively multiplied by weighting coefficients of 0.8, 1.0, and 1.0. As a result of this multiplication by the weighting coefficients, the order of the final candidates and scores are explosive sound: 69, vibration sound: 59, and idling (large-sized car): 56.

(Operation Procedure)

The procedure of an operation of weighting the likelihood calculation in accordance with the present situation input from an image will be explained below with reference to a flowchart shown in FIG. 11. Each of the following steps is executed under the control of a CPU 990. Note that the same reference numerals as in FIG. 4A and FIG. 4B denote the same processes in FIG. 11.

Figure 11:
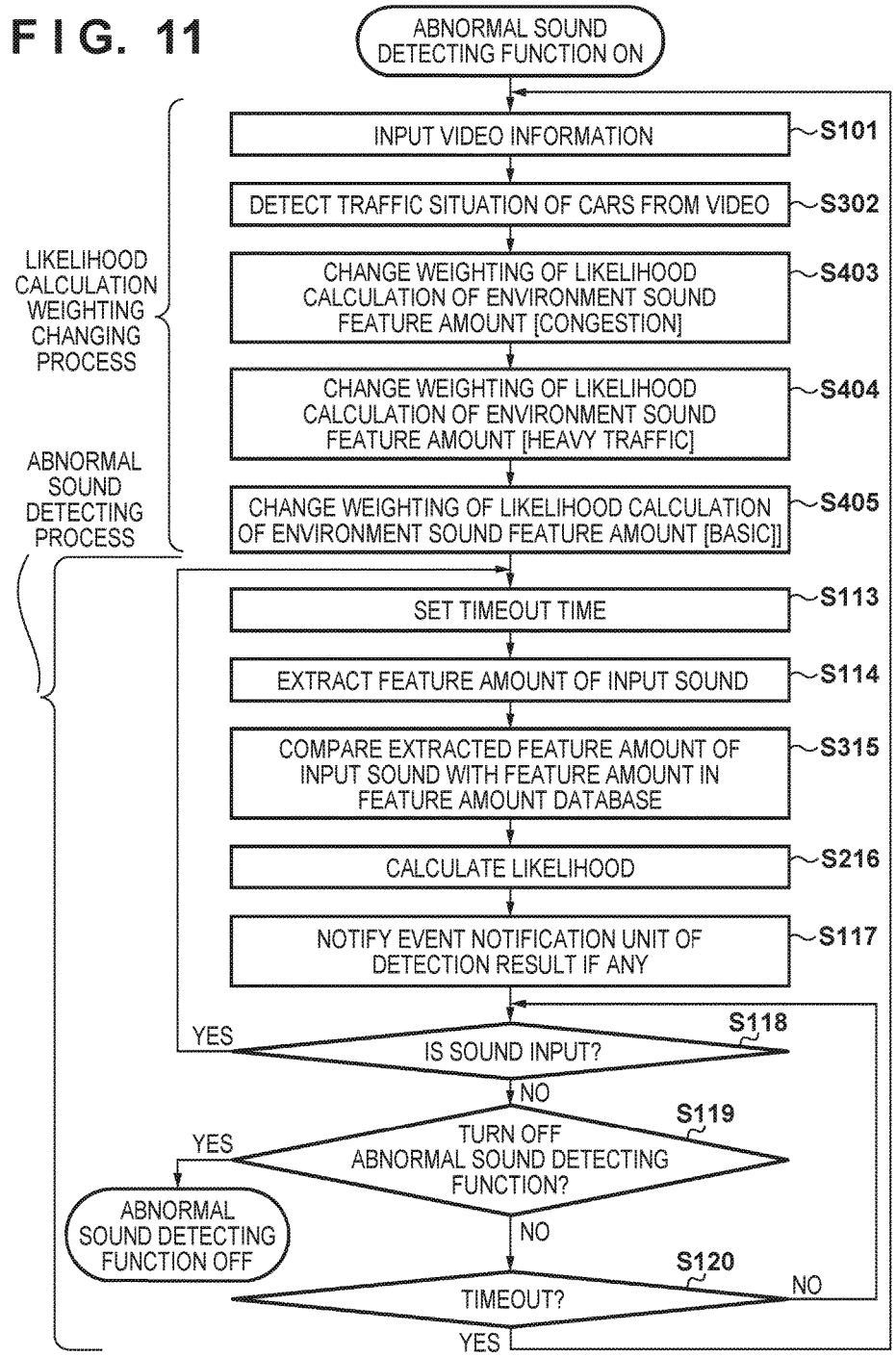
FIG. 11 is a flowchart showing the procedure of abnormal sound detection.

In steps S101 to S405 of FIG. 11, a likelihood calculation weighting changing process of changing likelihood weighting to be applied to each feature amount in accordance with the situation of a subject to be imaged, which is detected based on input video information, is executed. Then, in steps S113 to S120, an abnormal sound detecting process of detecting an abnormal sound by using the changed likelihood weighting is executed. In this embodiment as described above, an abnormal sound is detected by weighting the likelihood in accordance with the situation of a subject to be imaged. Accordingly, it is possible to accurately detect an abnormal sound regardless of the situation of a subject to be imaged.

When activated, the abnormal sound monitoring system D1000 stores video information from a video input apparatus A1008 in a video input unit A1009 in step S101. Then, in step S302, the traffic situation detector C1010 analyzes the input video information, and detects the degree of congestion and the traffic (traffic situation) from the number, processing speed, and passing frequency of cars on the image.

Subsequently, in step S403, the likelihood weighting determination unit B1011 calculates likelihood weighting coefficient of the environment sound feature amount [congestion] D103 from the results in step S302. In this step, 1.0, 0.8, and 0.9 are respectively set as the likelihood weighting coefficients for "congested", "heavy traffic", and "normal".

In step S404, the likelihood weighting determination unit B1011 calculates likelihood weighting coefficients of the environment sound feature amount [heavy traffic] D104 from the results in step S302. In this step, 0.8, 1.0, and 0.9 are respectively set as the likelihood weighting coefficients for "congested", "heavy traffic", and "normal".

In step S405, the likelihood weighting determination unit B1011 calculates likelihood weighting coefficients of the environment sound feature amount [basic] D105 from the results in step S302. For the environment sound feature amount [basic] D105, 1.0 is set as the weighting coefficient regardless of the detected traffic situation.

In step S113, a timeout time of 5 sec for performing next surrounding situation detection for updating the feature amount database C1005 is set in a detection timer unit A1018. In step S114, a feature amount extractor A1003 extracts the feature amount of a sound input to a sound input unit A1002. In step S315, a feature amount matching unit A1004 compares the feature amount extracted by the feature amount extractor A1003 with the feature amount in the feature amount database C1005.

In step S216, the likelihood calculator B1006 calculates the likelihood between each feature amount in the feature amount database C1005, which is multiplied by the coefficient calculated by the likelihood weighting determination unit B1011, and the feature amount of the input sound.

In step S117, a detection result determination unit A1007 determines whether the closest sound of the likelihood calculation results is a collision/breaking sound, and its likelihood has exceeded a predetermined threshold. If a collision/breaking sound having likelihood exceeding the threshold is detected as an abnormal sound, an event notification unit A1012 is notified of this information. The monitoring apparatus A1014 is notified of the event information via a communication unit A1013.

In step S118, whether a sound is input to the sound input unit A1002 is determined. The process advances to step S113 if the result is TRUE (YES in step S118), and advances to step S119 if the result is FALSE (NO in step S118).

In step S119, whether an abnormal sound detection system On/Off SW (switch) (not shown) is operated by the user is determined. The process according to the flowchart is terminated if the result is TRUE (YES in step S119), and advances to step S120 if the result is FALSE (NO in step S119).

In step S120, whether the detection timer unit A1018 has timed out is determined. The process advances to step S101 if the result is TRUE (YES in step S120), and advances to step S118 if the result is FALSE (NO in step S120).

In this embodiment as described above, when imaging a traffic environment, the possibility of sound generation is taken into account from the present situation, and the detection result is derived by weighting the likelihood calculation. This makes it possible to improve the detection accuracy of abnormal sound detection regardless of a change in imaging situation.

The preferred embodiments of the present invention have been explained above, but the present invention is not limited to these embodiments, and various modifications and changes can be made without departing from the spirit and scope of the invention.

For example, in an abnormal sound monitoring system for detecting abnormal sounds around train lines, the feature amount database A1005 may contain an alarm sound and train passing sound as environment sounds. In this case, it is also possible to include a detector for determining opening/closing of a railroad crossing and blinking of a signal from a camera image, instead of the surrounding situation detector A1010, and change the feature amount database or likelihood weighting in accordance with train passing detected by the detector.

Also, in an abnormal sound monitoring system for detecting abnormal sounds around a harbor, the feature amount database A1005 may contain a whistle sound and anchor sound as environment sounds. In this case, it is also possible to include a detector for determining the arriving/departing operation of a ship in the harbor from a camera image, instead of the surrounding situation detector A1010, and change the feature amount database or likelihood weighting in accordance with the arriving/departing operation of the ship detected by the detector.

In an abnormal sound monitoring system for detecting abnormal sounds of manufacturing apparatuses in a factory or the like, the feature amount database A1005 may contain a machine sound as an environment sound. In this case, it is also possible to include a detector for determining the operation of a manufacturing apparatus from a camera image, instead of the surrounding situation detector A1010, and change the feature amount database or weighting in accordance with the operation of the manufacturing apparatus detected by the detector.

In an abnormal sound monitoring system for detecting outdoor traffic abnormal sounds, the feature amount database A1005 may include environment sounds corresponding to weather situations such as fine weather, rainy weather, thundershower, storm, and snowfall. In this case, it is also possible to include a detector for determining the weather of an imaging site from a camera image, instead of the surrounding situation detector A1010, and change the feature amount database or likelihood weighting in accordance with the weather situation detected by the detector.

In an abnormal sound monitoring system for detecting abnormal sounds in a warehouse, the feature amount database A1005 may contain work sounds and operation sounds of works which are not performed in darkness as classified environment sounds. In this case, it is also possible to include a detector for determining the brightness of an imaging site from a camera image, instead of the surrounding situation detector A1010, and change the feature amount database or likelihood weighting in accordance with the brightness detected by the detector.

In an abnormal sound monitoring system for detecting abnormal sounds in a store, the feature amount database A1005 may contain, for example, the sound of opening/closing of a register, which is suspected of being robbery in the dark at night, as an environment sound. In this case, it is also possible to include a detector for determining the brightness of an imaging environment from a camera image, instead of the surrounding situation detector A1010, and selectively register the sound as an environment sound or abnormal sound in the feature amount database in accordance with the brightness detected by the detector.

Examples of abnormal sounds to be detected are a human scream sound, a human shout sound, the sound of gunfire, a glass breaking sound, a car collision/breaking sound, a train collision/breaking sound, and a ship collision/breaking sound.

When monitoring abnormalities by using sounds, the configuration of each of the abovementioned embodiments can improve the detection accuracy in accordance with the present situation.

Each embodiment described above can provide a technique capable of accurately detecting a specific sound.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. For example, each of the above-described flowcharts can be executed by the CPU 990 by performing processing based on a program loaded into a memory.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-187441, filed on Sep. 24, 2015, which is hereby incorporated by reference herein in its entirety.

What is claimed is:

1. A sound processing apparatus comprising:
   at least one processor and a memory connected to the at least one processor, wherein, when the at least one processor executes a program stored in the memory, the at least one processor functions as:
   a detection unit adapted to detect a situation of a subject to be imaged from image data generated by imaging the subject to be imaged by an imaging unit;
   an extraction unit adapted to extract a feature amount of a sound from sound data generated by a sound acquisition unit corresponding to the imaging unit;
   a database adapted to hold a feature amount of a specific sound in association with the situation of the subject to be imaged;
   an update unit adapted to update the feature amount of the specific sound held in the database based on the situation of the subject to be imaged detected by the detection unit, such that, if a feature amount corresponding to the situation of the subject to be imaged detected by the detection unit is not held in the database, the feature amount is set in the database, and, if a feature amount not corresponding to the situation of the subject to be imaged detected by the detection unit is held in the database, the feature amount not corresponding to the situation of the subject is deleted from the database; and
   a determination unit adapted to execute a process of comparing the feature amount of the sound extracted by the extraction unit with a feature amount of a specific sound held in the database updated by the update unit, and determine whether the sound contains the specific sound.

2. The apparatus according to claim 1, wherein the detection unit detects the number of specific objects contained in an image based on the image data, as the situation of the subject to be imaged.

3. The apparatus according to claim 1, wherein the detection unit detects brightness of an image based on the image data, as the situation of the subject to be imaged.

4. The apparatus according to claim 1, further comprising a monitoring unit adapted to monitor an abnormality in the subject to be imaged based on the determining whether the sound contains the specific sound.

5. A sound processing apparatus comprising:
at least one processor and a memory connected to the at least one processor, wherein, when the at least one processor executes a program stored in the memory, the at least one processor functions as:
a detection unit adapted to detect a situation of a subject to be imaged from image data generated by imaging the subject to be imaged by an imaging unit;
an extraction unit adapted to extract a feature amount of a sound from sound data generated by a sound acquisition unit corresponding to the imaging unit;
a database adapted to hold a feature amount of a specific sound in association with the situation of the subject to be imaged;
a weighting unit adapted to weight a likelihood of the feature amount of the specific sound held in the database, in accordance with the situation of the subject to be imaged detected by the detection unit, such that a likelihood of a feature amount corresponding to the situation of the subject to be imaged detected by the detection unit is weighted by using a value larger than that for a likelihood of a feature amount not corresponding to the detected situation of the subject to be imaged; and
a determination unit adapted to execute a process of comparing the feature amount of the sound extracted by the extraction unit with the feature amount of the specific sound having the likelihood weighted by the weighting unit, and determine whether the sound contains the specific sound.

6. The apparatus according to claim 1, wherein the sound acquisition unit collects sounds around the subject to be imaged.

7. A sound processing method executed by a processor of a sound processing apparatus, the method comprising:
detecting a situation of a subject to be imaged from image data generated by imaging the subject to be imaged by an imaging unit;
extracting a feature amount of a sound from sound data generated by a sound acquisition unit corresponding to the imaging unit;
updating the feature amount of the specific sound held in a database, which holds the feature amount of the specific sound in association with the situation of the subject to be imaged, based on the situation of the subject to be imaged detected in the detecting, such that, if a feature amount corresponding to the situation of the subject to be imaged detected in the detecting is not held in the database, the feature amount is set in the database, and, if a feature amount not corresponding to the situation of the subject to be imaged detected in the detecting is held in the database, the feature amount not corresponding to the situation of the subject to be imaged is deleted from the database; and
executing a process of comparing the feature amount of the sound extracted in the extracting with a feature amount of a specific sound held in the database updated in the updating, and determining whether the sound contains the specific sound.

8. A computer-readable non-transitory storage medium storing a program which causes a computer to execute:
detecting a situation of a subject to be imaged from image data generated by imaging the subject to be imaged by an imaging unit;
extracting a feature amount of a sound from sound data generated by a sound acquisition unit corresponding to the imaging unit;
updating the feature amount of the specific sound held in a database, which holds the feature amount of the specific sound in association with the situation of the subject to be imaged, based on the situation of the subject to be imaged detected in the detecting, such that, if a feature amount corresponding to the situation of the subject to be imaged detected in the detecting is not held in the database, the feature amount is set in the database, and, if a feature amount not corresponding to the situation of the subject to be imaged detected in the detecting is held in the database, the feature amount not corresponding to the situation of the subject to be imaged is deleted from the database; and
executing a process of comparing the feature amount of the sound extracted by the extracting with a feature amount of a specific sound held in the database updated by the updating, and determining whether the sound contains the specific sound.

9. A sound processing method executed by a processor of a sound processing apparatus, the method comprising:
detecting a situation of a subject to be imaged from image data generated by imaging the subject to be imaged by an imaging unit;
extracting a feature amount of a specific sound from sound data generated by a sound acquisition unit corresponding to the imaging unit;
weighting a likelihood of the feature amount of a specific sound, held in a database which holds the feature amount of the specific sound in association with the situation of the subject to be imaged, in accordance with the situation of the subject to be imaged detected in the detecting, such that a likelihood of a feature amount corresponding to the situation of the subject to be imaged detected in the detecting is weighted by using a value larger than that for a likelihood of a feature amount not corresponding to the detected situation of the subject to be imaged; and
executing a process of comparing the feature amount of the sound extracted in the extracting with the feature amount of the specific sound having the likelihood weighted in the weighting, and determining whether the sound contains the specific sound.

10. A computer-readable non-transitory storage medium storing a program which causes a computer to execute:
detecting a situation of a subject to be imaged from image data generated by imaging the subject to be imaged by an imaging unit;
extracting a feature amount of a sound from sound data generated by a sound acquisition unit corresponding to the imaging unit;
weighting a likelihood of the feature amount of the specific sound held in a database, which holds a feature amount of a specific sound in association with the situation of the subject to be imaged, in accordance with the situation of the subject to be imaged detected by the detecting, such that a likelihood of a feature amount corresponding to the situation of the subject to be imaged detected by the detecting is weighted by using a value larger than that for a likelihood of a feature amount not corresponding to the detected situation of the subject to be imaged; and
executing a process of comparing the feature amount of the sound extracted by the extracting with the feature amount of the specific sound having the likelihood weighted by the weighting, and determining whether the sound contains the specific sound.

* * * * *